US010118495B2

(12) United States Patent
Emrani

(10) Patent No.: US 10,118,495 B2
(45) Date of Patent: Nov. 6, 2018

(54) VEHICLE POWER DISTRIBUTION HAVING RELAY WITH INTEGRATED VOLTAGE CONVERTER

(71) Applicant: Ford Global Technologies, LLC, Dearborn, MI (US)

(72) Inventor: Amin Emrani, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 272 days.

(21) Appl. No.: 14/957,937

(22) Filed: Dec. 3, 2015

(65) Prior Publication Data

US 2017/0158062 A1 Jun. 8, 2017

(51) Int. Cl.
*B60L 11/18* (2006.01)

(52) U.S. Cl.
CPC ..................... *B60L 11/18* (2013.01)

(58) Field of Classification Search
CPC ....................................................... B60L 11/18
USPC ......... 309/9.1, 10.1, 139; 307/9.1, 10.1, 139
See application file for complete search history.

(56) References Cited

U.S. PATENT DOCUMENTS

| 9,685,868 B2* | 6/2017 | de Cremoux | H02M 3/1588 |
| 2002/0130645 A1* | 9/2002 | Tsai | G05F 1/24 |
| | | | 323/274 |
| 2003/0090237 A1* | 5/2003 | Shenai | H02J 7/0052 |
| | | | 320/139 |
| 2009/0103341 A1* | 4/2009 | Lee | B60W 10/26 |
| | | | 363/124 |
| 2014/0320047 A1* | 10/2014 | Sakata | B60L 11/18 |
| | | | 318/139 |
| 2015/0244269 A1* | 8/2015 | Yu | H02M 1/44 |
| | | | 323/284 |
| 2017/0126120 A1* | 5/2017 | Chakraborty | H02M 3/158 |

FOREIGN PATENT DOCUMENTS

| DE | 102012223428 A1 | 6/2014 |
| GB | 2509009 A | 6/2014 |
| JP | 2010284064 A | 12/2010 |

(Continued)

OTHER PUBLICATIONS

Great Britain Search Report for Great Britain Application No. 1620435.6 dated Jul. 31, 2017.

(Continued)

*Primary Examiner* — William Hernandez
(74) *Attorney, Agent, or Firm* — Frank A. MacKenzie; Brooks Kushman P.C.

(57) ABSTRACT

A vehicle power distribution system includes a battery having a nominal voltage, a vehicle electrical load having a supply voltage different than the nominal voltage, and a monolithic solid state relay including integrated circuitry to convert the nominal voltage to the rated voltage and an output configured to selectively energize the vehicle electrical load with the rated voltage in response to a control signal from a vehicle controller applied to an input of the relay. The relay may include a PWM controller to provide a switching signal to a transistor connected to an output filter to step down the nominal voltage of the battery to the rated voltage of the vehicle electrical load. Relay output voltage and current monitoring circuitry may be connected to the PWM controller to provide over current and over voltage protection.

11 Claims, 2 Drawing Sheets

(56) References Cited

FOREIGN PATENT DOCUMENTS

| JP | 2012124807 A | 6/2012 |
|----|--------------|--------|
| JP | 2014007830 A | 1/2014 |
| JP | 201402453 A | 2/2014 |
| KR | 20120083066 A | 7/2012 |
| KR | 101343392 B1 | 12/2013 |
| KR | 101404638 B1 | 7/2014 |
| WO | 2015040854 A1 | 3/2015 |
| WO | 2015124885 A1 | 8/2015 |
| WO | 2016170724 A1 | 10/2016 |

OTHER PUBLICATIONS

Great Britain Search Report for Great Britain Application No. 1620435.6 dated May 15, 2017.

* cited by examiner

VEHICLE POWER DISTRIBUTION HAVING RELAY WITH INTEGRATED VOLTAGE CONVERTER

TECHNICAL FIELD

Aspects of the disclosure relate to vehicle power distribution with relays having integrated voltage converters to convert voltage from a vehicle power source to voltage acceptable for a vehicle electrical load.

BACKGROUND

Vehicles typically include low voltage power distribution systems to power a wide variety of vehicle components and accessories. Representative automotive and transportation vehicle applications may include a 12V or 24V low voltage power distribution system, respectively, to power vehicle control modules, such as a powertrain controller, body controller, battery controller, and the like as well as vehicle lighting, HVAC, windows, mirrors, wipers, infotainment system, navigation system, and countless other systems, motors, actuators, sensors, modules, etc. The increasing demands on vehicle power distribution systems are nearing practical limits of the 12V and 24V systems. As such, higher voltage levels, such as 48V for example, have been proposed and discussed in automotive industries for several years. However, various accessories, components, or devices may not be compatible with a new, higher voltage. To address this issue, various automotive OEM and suppliers have suggested a two-voltage or dual voltage distribution system with a high power bi-directional converter to connect the two voltage distribution systems together.

Currently proposed dual voltage distribution systems include a number of design challenges. For example, converters generally operate with high efficiency only within a limited operating range of loads. Proposed systems also employ a second battery that increases cost and complexity of the system and requires additional voltage and current monitoring. These systems would also use additional copper wiring in more complex wiring harnesses to supply each voltage level to loads disposed throughout the vehicle. Flexibility of these systems is also limited for future system upgrades.

SUMMARY

In various embodiments, a method or system for vehicle power distribution includes a battery having a second or nominal voltage, a load having a first or rated voltage different from the nominal voltage, and a relay including circuitry to convert the first or nominal voltage to the second or rated voltage and an output configured to selectively energize the load with the second or rated voltage in response to a control signal from a vehicle controller applied to an input of the relay. The relay may be implemented by a monolithic solid state relay having integrated circuitry to step-down the nominal voltage to the rated voltage. In various embodiments, the relay is configured to selectively connect the output to ground. The voltage conversion circuitry may include circuitry to step-down the nominal voltage using a transistor, an output filter connected to the transistor, and a controller coupled to the transistor and configured to generate a pulse width modulated (PWM) switching signal having a duty cycle based on the nominal voltage and the rated voltage. The output filter may be implemented by an L-C filter. The system may also include a traction battery in addition to the battery having the nominal voltage, and a DC/DC converter coupled to the traction battery and the battery having the nominal voltage.

In various embodiments, the relay with integrated voltage converter includes circuitry to step-down the nominal voltage including a transistor having a source, a drain, and a gate, a diode connected between the drain and ground, an inductor connected to the drain, a capacitor connected between the inductor and ground, and a controller configured to generate a switching signal connected to the gate, the switching signal having a duty cycle based on the nominal voltage and the rated voltage. In one embodiment, the nominal voltage is 48V and the rated voltage is 12V with a duty cycle or "ON" time of 0.25 or 25%. The relay may also include voltage protection diodes connected in series with opposite polarity between the drain and the gate. Some embodiments provide current sense circuitry connected between the load and the controller and voltage sense circuitry connected across the load and connected to the controller.

Embodiments according to the disclosure may also include a method for vehicle power distribution that includes powering a vehicle electrical load having a first voltage lower than a second voltage from a vehicle power supply through a relay having an integrated voltage converter that converts the second voltage to the first voltage, and energizes the vehicle electrical load in response to a relay input signal from a vehicle controller. The relay may be implemented by a monolithic solid state relay having integrated circuitry including a switching transistor connected to a pulse width modulating controller configured to generate a switching signal having a duty cycle based on the first and second voltages. The method may also include the pulse width modulating controller monitoring current and voltage provided to the vehicle electrical load via associated current sense circuitry and voltage sense circuitry, respectively.

Various embodiments of a vehicle power distribution system include a monolithic solid state relay including integrated circuitry to convert a nominal vehicle battery voltage to a supply voltage of a vehicle electrical load, and to selectively energize the vehicle electrical load in response to a control signal from a vehicle controller applied to an input of the relay. The integrated circuitry may include a transistor, a controller connected to the transistor and that generates a switching signal having a predetermined duty cycle based on the nominal vehicle battery voltage and the supply voltage, and an output filter including an inductor and a diode connected to the transistor and a capacitor connected to the inductor. The system may also include voltage protection diodes connected in series with opposite polarity between a gate and drain of the transistor. Voltage sense circuitry connected to the controller and configured to monitor relay output voltage and current sense circuitry connected to the controller and configured to monitor relay output current may also be provided.

Embodiments according to the present disclosure may provide one or more advantages. For example, a vehicle power distribution system using relays with integrated voltage converters according to the present disclosure can provide a higher voltage battery (such as 48V) while eliminating the need for a second auxiliary battery for legacy components or accessories. Similarly, use of relays with integrated step-down converters eliminates the need for a high power DC/DC converter having a high efficiency over a wide range of output power and reduces power monitoring complexity. A relay with an integrated voltage converter according to embodiments of the present disclosure increases flexibility of the vehicle power distribution system to be adapted to components or accessories having a wide range of operating voltages by using different relays for particular loads or devices having voltage requirements different from the nominal battery voltage. The system may accommodate future devices with different voltage requirements by changing the relay or switching device rather than changing the auxiliary battery, wiring harness, etc. Relays with an integrated voltage converter according to embodiments of the present disclosure also reduce the complexity of the wiring harness and amount of copper required for a dual or multiple voltage power distribution system.

The above advantages and other advantages and features associated with various embodiments will be readily apparent to those of ordinary skill in the art from the following detailed description when taken in connection with the accompanying drawings.

DETAILED DESCRIPTION

As required, detailed embodiments are disclosed herein; however, it is to be understood that the disclosed embodiments are merely representative of the claimed subject matter and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure generally provide for a plurality of circuits including various electrical components to provide power distribution using a relay having integrated voltage conversion to power electrical loads, accessories, components, devices, etc. by selectively connecting an electrical load to power or ground in response to a control signal. All references to the circuits and other electrical devices and the functionality provided by each, are not intended to be limited to encompassing only those configurations illustrated and described herein. While particular labels may be assigned to the various circuits or other electrical components or devices disclosed, such labels are not intended to limit the scope of operation for the circuits and the other electrical devices. It is recognized that any circuit or other electrical device disclosed herein may include any number of discrete passive and active components such as resistors, capacitors, transistors, amplifiers, analog/digital converters (ADC or A/D converters), microprocessors, integrated circuits, non-transitory memory devices (e.g., FLASH, random access memory (RAM), read only memory (ROM), electrically programmable read only memory (EPROM), electrically erasable programmable read only memory (EEPROM), or other suitable variants thereof) and software which cooperate with one another to perform operation(s) disclosed herein. In addition, any one or more of the electric devices may be configured to execute a computer program that is embodied in a non-transitory computer readable storage medium that includes instructions to program a computer or controller to perform any number of the functions as disclosed.

Figure 1:
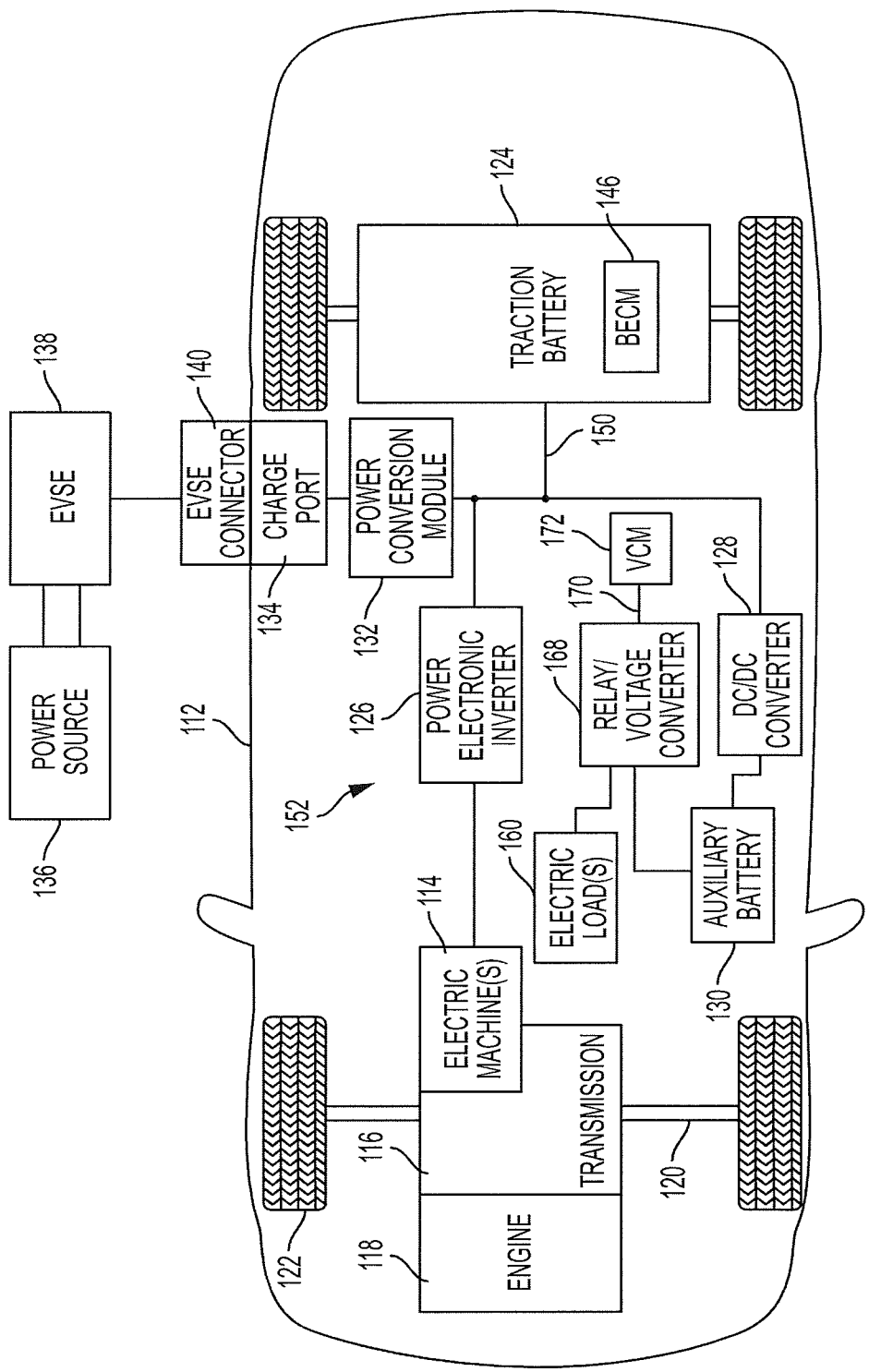
FIG. 1 is a block diagram of a vehicle power distribution system having relays with integrated voltage converters according to a representative electric vehicle embodiment.

FIG. 1 is a block diagram of a representative electric vehicle embodiment having a power distribution system using relays with integrated voltage converters. While a plug-in hybrid vehicle having an internal combustion engine is illustrated in this representative embodiment, those of ordinary skill in the art will recognize that the disclosed embodiments of a relay with an integrated voltage converter may also be utilized in other applications for power distribution systems and methods and are independent of the particular vehicle powertrain. Representative vehicle applications may include conventional internal combustion engine vehicles, hybrid vehicles, electric vehicles, or any other type of vehicle having a battery providing a nominal battery voltage and one or more selectively powered electrical loads having a supply or rated voltage different from the nominal battery voltage.

Embodiments of relays having integrated voltage conversion include various embodiments implemented by a monolithic solid state device with electrical components fabricated on a monolithic substrate. Those of ordinary skill in the art may recognize various advantages associated with monolithic or integrated circuit implementations of a relay with integrated voltage converter related to reduced cost, improved reliability, reduced complexity, etc. relative to a discrete component implementation.

In the representative application illustrated in FIG. 1, a plug-in hybrid-electric vehicle 112 may include one or more electric machines 114 mechanically connected to a hybrid transmission 116. The electric machines 114 may be capable of operating as a motor or a generator. For hybrid vehicles, a transmission 116 is mechanically connected to an internal combustion engine 118. The transmission 116 is also mechanically connected to a drive shaft 120 that is mechanically connected to the wheels 122. The description herein is equally applicable to a battery electric vehicle (BEV), where the hybrid transmission 116 may be a gear box connected to an electric machine 114 and the engine 118 may be omitted as previously described. The electric machines 114 can provide propulsion and deceleration capability whether or not the engine 118 is operating. The electric machines 114 also act as generators and can provide fuel economy benefits by recovering energy that would normally be lost as heat in the friction braking system.

For hybrid or electric vehicle applications of a power distribution system as illustrated in FIG. 1, a traction battery or traction battery pack 124 stores energy in a plurality of individual battery cells connected together that can be used by the electric machines 114. Vehicle battery pack 124 typically provides a high voltage DC output to a high voltage bus 150, although the voltage and current may vary depending on particular operating conditions and loads. The traction battery pack 124 is electrically connected to one or more external circuits 152, which may include a power electronics or inverter circuit 126, a DC/DC converter circuit 128 and/or a power conversion module or circuit 132, for example. One or more contactors may isolate the traction battery pack 124 from other components when opened, and connect the traction battery pack 124 to the other components when closed.

In addition to providing energy for propulsion, the traction battery pack 124 may provide energy for other external circuits 152 connected to the high voltage bus 150. The power distribution system of vehicle 112 may also include a DC/DC converter module or circuit 128 that converts the high voltage DC output of the traction battery 124 to a low voltage DC supply that is compatible with other vehicle loads that may be directly connected. Other external high voltage circuits or loads, such as those for cabin or component heaters, may be connected directly to the high voltage bus 50 without the use of a DC/DC converter module 128.

Vehicle 112 may also include an auxiliary battery 130 having a nominal voltage (such as 24V or 48V, for example). As understood by those of ordinary skill in the art, the actual voltage supplied by auxiliary battery 130 will vary during operation depending on a number of ambient and operating conditions such as temperature, battery charge, current, battery age, etc. Auxiliary battery 130 may also be referred to as a low-voltage battery, starter battery or simply the vehicle battery for various applications, particularly those without a high-voltage traction battery. Auxiliary battery 130 may be used to power various low-voltage components, controllers, modules, motors, actuators, sensors, etc. of various vehicle systems and subsystems that have a rated voltage or supply voltage different from the nominal voltage of auxiliary battery 130 and generally represented by electric loads 160. One or more relay/voltage converters 168 power vehicle electrical load(s) 160 having a supply voltage or first voltage lower than a nominal voltage or second voltage from the vehicle power supply as represented by auxiliary battery 130. In this embodiment, relay/voltage converter 168 includes a relay having an integrated step-down voltage converter that converts the second voltage to the first voltage in response to a relay input signal 170 provided by a vehicle control module (VCM) 172.

Figure 2:
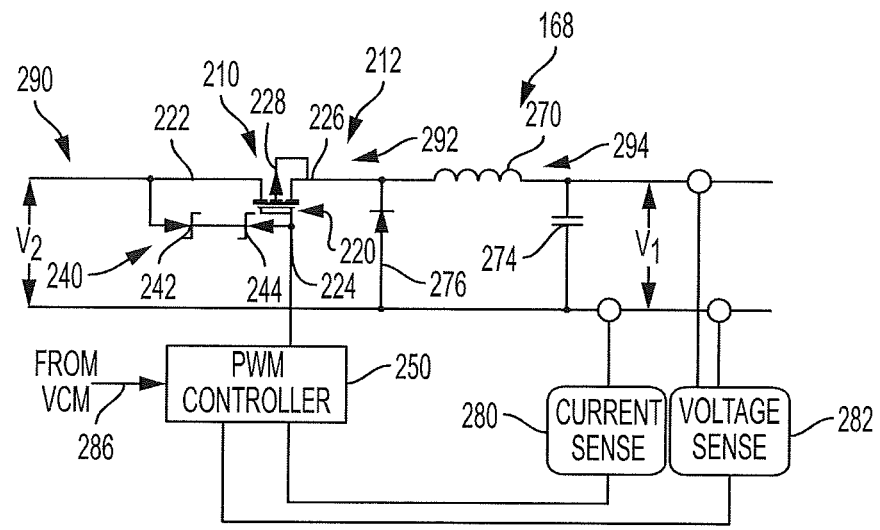
FIG. 2 is a simplified circuit schematic illustrating operation of a system or method for power distribution using a relay with an integrated step-down converter according to a representative embodiment.
Figure 3:
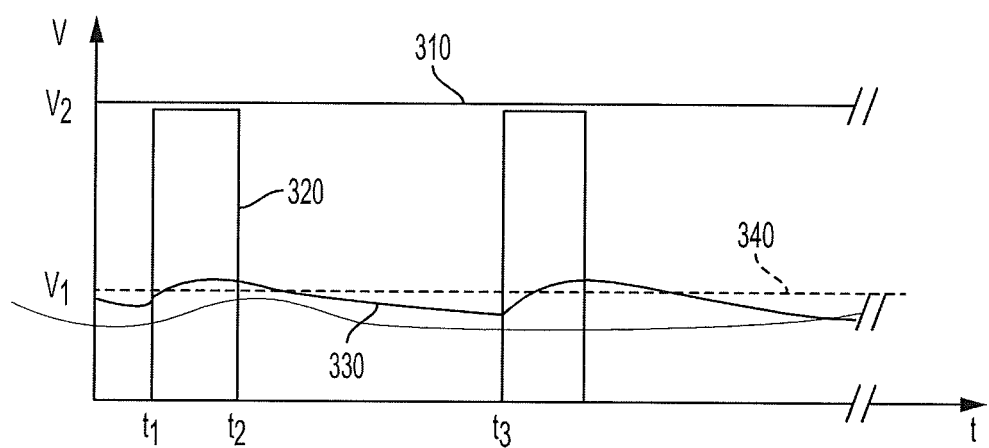
FIG. 3 illustrates representative signals for a relay having an integrated step-down voltage converter according to various embodiments.

As described in greater detail with respect to FIGS. 2-3, relay/voltage converter 168 may be implemented by a monolithic solid state relay including integrated circuitry to convert the nominal voltage (48V in one embodiment) of vehicle auxiliary battery 130 to a supply voltage or rated voltage (12V in one embodiment) of a vehicle electrical load 160, and to selectively energize the vehicle electrical load 160 in response to a control signal from a vehicle controller (such as VCM 172) applied to an input 170 of the relay 168.

Traction battery pack 124 may be recharged by an external power source 136. The external power source 136 may be a connection to an electrical outlet connected to the power grid. The external power source 136 may be electrically connected to electric vehicle supply equipment (EVSE) 138. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be electrically connected to a charger or on-board power conversion module 132. Alternatively, various components described as being electrically connected may transfer power using a wireless inductive coupling.

The various components illustrated in FIG. 1 may have one or more associated controllers, control modules, and/or processors such as VCM 172 to control and monitor the operation of the components. The controllers may communicate via a serial peripheral interface (SPI) bus (e.g., Controller Area Network (CAN)) or via discrete conductors. Various operating parameters or variables may be broadcast or published using the CAN or other conductors for use by vehicle control modules or sub-modules in controlling the vehicle or vehicle components, such as the traction battery pack 124 or electric load(s) 160, for example. One or more controllers may operate in a stand-alone manner without communication with one or more other controllers. The controllers may include a Battery Energy Control Module (BECM) 146 to control various charging and discharging functions, battery cell charge balancing, battery pack voltage measurements, individual battery cell voltage measurements, battery over-charge protection, battery over-discharge protection, battery end-of-life determination, etc. The controllers may include and/or communicate with various types of non-transitory computer readable storage media including persistent and temporary storage devices to store control logic, algorithms, programs, operating variables, and the like. One or more controllers may be connected to one or more associated relay/voltage converters 168 to provide a control signal to energize an associated load by selectively connecting an output of the relay/voltage converter 168 to power or ground depending on the particular application and implementation.

FIG. 2 is a simplified circuit schematic illustrating operation of a system or method for power distribution using a relay with an integrated step-down converter according to a representative embodiment. Relay/voltage converter 168 functions to selectively energize or power a connected electrical load as well as providing integrated step-down voltage conversion while preventing over current, over voltage, and over temperature conditions. In one embodiment, the circuitry illustrated is implemented in a monolithic solid state device and can be used to improve the efficiency and performance of the electrical distribution system by eliminating the need for a secondary electrical distribution system to accommodate electrical loads have voltage requirements different from the nominal battery voltage. Compatible electrical loads can be directly connected to the auxiliary battery while legacy components or devices that require a different voltage may be selectively powered through the integrated relay/voltage converter 168.

Those of ordinary skill in the art will recognize that various applications of a relay with integrated voltage converter similar to that shown in the simplified circuit schematic of FIG. 2 may include additional circuit components to provide the described functionality or enhanced functionality, such as operating status or communication with a vehicle network, for example. Relay 168 includes a relay or switching portion 210 connected to a voltage conversion portion 212. In this embodiment, the relay portion 210 and voltage conversion portion 212 share a common switching device implemented by a transistor 220. In other embodiments, relay portion 210 may be implemented by any of a number of commercially available solid state relay architectures having a separate transistor or other switching device coupled to a voltage down-converter or buck converter. Transistor 220 may be implemented by any suitable type of transistor and technology for the particular load being powered. In one embodiment, transistor 220 is a FET while other higher voltage embodiments may utilize an IGBT.

Transistor 220 includes a drain 222, a gate 224, a source 226, and a base or bulk connection 228, typically connected to either the drain 222 or source 226. The system may include over voltage protection circuitry 240 implemented by diodes 242, 244 connected in series with opposite polarity between the drain 222 and gate 224 of transistor 220. A switching controller implemented by a pulse width modulating (PWM) controller 250 is connected to the gate 224 of transistor 220 and is configured to provide a switching signal having a duty cycle "ON" time based at least in part on the nominal battery voltage $V_2$ and the rated or supply voltage $V_1$ of the connected electrical load(s) 160 (FIG. 1).

As also shown in FIG. 2, an output filter implemented by an L-C filter in this representative embodiment includes an inductor 270 connected to the source 226 and connected to a capacitor 274. The circuitry also includes a diode 276 connected to drain 226 and inductor 270. Current sense circuitry 280 and voltage sense circuitry 282 is connected to controller 250 to provide current and voltage monitoring. Controller 250 may include control logic or programming to monitor the output current and voltage to provide over current and over voltage protection by deactivating or de-energizing transistor 220. Controller 250 may include an input 286 that receives a signal from the VCM 172 (FIG. 1) to energize any connected electrical loads by applying an associated switching signal to gate 224 of transistor 220.

FIG. 3 illustrates representative voltage waveforms for a relay having an integrated step-down voltage converter according to various embodiments. The representative voltage waveforms generally illustrate the voltages as a function of time over a complete switching cycle at various points 290, 292, 294 of the integrated relay/voltage converter 168 illustrated in FIGS. 1 and 2. With reference to FIGS. 1-3, voltage 310 represents the nominal voltage $V_2$ of the vehicle accessory power supply, typically provided by a low voltage or auxiliary battery 130. In the representative embodiment illustrated, $V_2$ is 48 volts (V) and represents the voltage at point 290 of the simplified circuit schematic. voltage 320 is the voltage at point 292 resulting from a corresponding pulse width modulated signal generated by PWM controller 250 and applied to gate 224 to energize a connected electrical load in response to a control signal from a vehicle controller (such as VCM 172) applied to the input 286. The PWM signal applied to gate 224 may have a lower voltage amplitude than the voltage 320. voltage 330 represents the filtered output voltage at point 294 of the simplified schematic circuit having a nominal DC voltage $V_1$ as represented by broken line 340.

The duty cycle of the PWM switching signal and resulting unfiltered output voltage 320 is determined based on the desired battery voltage represented by $V_2$ and the supply or rated voltage of the connected electrical load represented by $V_1$. The duty cycle may be specified by the "ON" time of the transistor 220 from time $t_1$ to time $t_2$, divided by the cycle time for a single switching cycle represented by time $t_1$ to time $t_3$. In one embodiment with a nominal battery voltage of 48V and a rated or supply voltage for a representative electrical load of 12V, PWM controller 250 generates a switching signal applied to gate 224 of transistor 220 of 0.25 or 25%.

As such, embodiments according to the present disclosure such as the representative embodiments described above may provide one or more advantages relative to various prior art or proposed power distribution strategies for a wide variety of applications. For example, a power distribution system using relays with integrated step-down or buck converters according to the present disclosure can provide a higher voltage (such as 48V) battery while eliminating the need for a second auxiliary battery for legacy components or accessories. Similarly, use of relays with integrated voltage converters eliminates the need for a high power DC/DC converter having a high efficiency over a wide range of output power and reduces power monitoring complexity. A relay with an integrated voltage converter according to embodiments of the present disclosure increases flexibility of the vehicle power distribution system to be adapted to components or accessories having a wide range of operating voltages by using different relays for particular loads or devices having rated voltages different from the nominal battery voltage. The system may accommodate future devices with different voltage requirements by changing the relay or switching device rather than the auxiliary battery, wiring harness, etc. Relays with an integrated voltage converter according to embodiments of the present disclosure also reduce the complexity of the wiring harness and amount of copper required for a dual or multiple voltage power distribution system.

While representative embodiments are described above, it is not intended that these embodiments describe all possible forms of the claimed subject matter. Rather, the words used in the specification are words of description rather than limitation, and it is understood that various changes may be made without departing from the spirit and scope of the disclosure. Additionally, the features of various implementing embodiments may be combined to form further embodiments that are not explicitly described or illustrated. While various embodiments may have been described as providing advantages or being preferred over other embodiments or prior art implementations with respect to one or more desired characteristics, as one of ordinary skill in the art is aware, one or more features or characteristics may be compromised to achieve desired overall system attributes, which depend on the specific application and implementation. These attributes include, but are not limited to: cost, strength, durability, life cycle cost, marketability, appearance, packaging, size, serviceability, weight, manufacturability, ease of assembly, etc. Embodiments described as less desirable than other embodiments or prior art implementations with respect to one or more characteristics are not necessarily outside the scope of the disclosure and may be desirable for particular applications.

What is claimed is:

1. A vehicle system, comprising:
   a battery having a nominal voltage;
   a load having a rated voltage less than the nominal voltage;
   a traction battery;
   a DC/DC converter coupled to the traction battery and the battery; and
   a relay including circuitry to step-down the nominal voltage to the rated voltage and an output configured to selectively energize the load with the rated voltage in response to a control signal applied to an input of the relay.

2. The system of claim 1 wherein the relay comprises a monolithic solid state relay having integrated circuitry to step-down the nominal voltage to the rated voltage.

3. The system of claim 1, wherein the circuitry to step-down the nominal voltage comprises:
   a transistor;
   an output filter connected to the transistor; and a controller coupled to the transistor and configured to generate a pulse width modulated switching signal.

4. The system of claim 3, wherein the output filter comprises an L-C filter.

5. The system of claim 3, wherein the controller is further configured to generate a pulse width modulated switching signal having a duty cycle of 0.25.

6. The system of claim 1 wherein the battery has a nominal voltage of 48 volts and the load has a rated voltage of 12 volts.

7. The system of claim 1, wherein the circuitry to step-down the nominal voltage comprises:
a transistor having a source, a drain, and a gate;
a diode connected between the source and ground;
an inductor connected to the source;
a capacitor connected between the inductor and ground; and
a controller configured to generate a switching signal connected to the gate, the switching signal having a duty cycle based on the nominal voltage and the rated voltage.

8. The system of claim 7 further comprising:
second and third diodes connected in series with opposite polarity between the drain and the gate.

9. The system of claim 8 further comprising:
current sense circuitry connected between the load and the controller; and
voltage sense circuitry connected across the load and connected to the controller.

10. A vehicle power distribution system, comprising:
a monolithic solid state relay including integrated circuitry to convert a nominal vehicle battery voltage to a supply voltage of a vehicle electrical load, and to selectively energize the vehicle electrical load in response to a control signal from a vehicle controller applied to an input of the relay, wherein the integrated circuitry comprises:
a transistor;
a controller connected to the transistor and that generates a switching signal having a predetermined duty cycle based on the nominal vehicle battery voltage and the supply voltage;
an output filter including an inductor and a diode connected to the transistor and a capacitor connected to the inductor; and
voltage protection diodes connected in series with opposite polarity between a gate and source of the transistor.

11. The system of claim 10 further comprising:
voltage sense circuitry connected to the controller and configured to monitor a relay output voltage; and
current sense circuitry connected to the controller and configured to monitor a relay output current.

* * * * *